US010715936B2

(12) United States Patent
Dickmann et al.

(10) Patent No.: US 10,715,936 B2
(45) Date of Patent: Jul. 14, 2020

(54) HEARING DEVICE WITH WIRELESS INTERFACE

(71) Applicant: Sonova AG, Staefa (CH)

(72) Inventors: Georg Dickmann, Ebmatingen (CH); Daniel Lucas-Hirtz, Rapperswil (CH)

(73) Assignee: Sonova AG, Staefa (CH)

(*) Notice: Subject to any disclaimer, the term of this patent is extended or adjusted under 35 U.S.C. 154(b) by 0 days.

(21) Appl. No.: 16/341,066

(22) PCT Filed: Oct. 12, 2016

(86) PCT No.: PCT/EP2016/074439
§ 371 (c)(1),
(2) Date: Apr. 11, 2019

(87) PCT Pub. No.: WO2018/068844
PCT Pub. Date: Apr. 19, 2018

(65) Prior Publication Data
US 2019/0230451 A1    Jul. 25, 2019

(51) Int. Cl.
*H04R 25/00* (2006.01)
*H04W 4/80* (2018.01)
(Continued)

(52) U.S. Cl.
CPC .......... *H04R 25/554* (2013.01); *H04B 5/0006* (2013.01); *H04H 60/92* (2013.01);
(Continued)

(58) Field of Classification Search
CPC .... H04R 25/554; H04R 1/1041; H04R 27/00; H04R 2420/07; H04W 4/80; H04W 8/005;
(Continued)

(56) References Cited

U.S. PATENT DOCUMENTS 10,149,340 B1 *  12/2018  Rabii ............... B64D 11/00153
2005/0220046 A1 *  10/2005  Falck .................... H04W 76/10
370/315
(Continued)

FOREIGN PATENT DOCUMENTS

WO    WO-2018074892 A1 *  4/2018  ............ H04W 12/04

OTHER PUBLICATIONS

CEVA: "RivieraWaves Bluetooth Platforms", Aug. 15, 2016, XP002768469, Retrieved from the Internet: URL:http://www.ceva-dsp.com/RivieraWaves-Bluetooth-Platforms [retrieved on Mar. 22, 2017].
(Continued)

*Primary Examiner* — Sean H Nguyen

(57) ABSTRACT

There is provided a hearing device (10) comprising a BTLE 4.1 or higher wireless interface (20) and a control unit (38) for handling connectivity via the wireless interface to a plurality of client devices (40, 42, 44, 46, 48, 50, 54, 56) wherein the control unit is configured to direct the hearing device to transmit connectable advertising packets at least as long as less than N client devices are connected to the hearing device via a protected connection (30) and less than N+1 client devices are connected to the hearing device in total; wherein the control unit is further configured to prevent that the hearing device maintains sustained connections to more than N client devices at a time by disconnecting, if the hearing device is connected to N client devices via sustained connections and at least one of these connections is not a protected connection, one of the client devices connected via a not protected connection once a new sustained connection to a client device has been established in addition to the N connections, with N≥2.

17 Claims, 4 Drawing Sheets

(51) Int. Cl.
| | |
|---|---|
| H04R 1/10 | (2006.01) |
| H04M 1/00 | (2006.01) |
| H04B 5/00 | (2006.01) |
| H04H 60/92 | (2008.01) |
| H04L 29/08 | (2006.01) |
| H04R 27/00 | (2006.01) |
| H04W 8/00 | (2009.01) |

(52) U.S. Cl.
CPC ............ *H04L 67/104* (2013.01); *H04M 1/00* (2013.01); *H04R 1/1041* (2013.01); *H04R 27/00* (2013.01); *H04W 4/80* (2018.02); *H04R 2420/07* (2013.01); *H04W 8/005* (2013.01)

(58) Field of Classification Search
CPC .... H04B 5/0006; H04H 60/92; H04L 67/104; H04M 1/00
USPC .......................................................... 381/315
See application file for complete search history.

(56) References Cited

U.S. PATENT DOCUMENTS

| | | | |
|---|---|---|---|
| 2010/0016035 A1* | 1/2010 | Pullen ............... | H04W 52/0232 455/574 |
| 2010/0151791 A1 | 6/2010 | Yi et al. | |
| 2015/0146881 A1 | 5/2015 | Malsbary et al. | |
| 2015/0172290 A1 | 6/2015 | Kasslin | |
| 2015/0319600 A1 | 11/2015 | Knaappila | |
| 2015/0350766 A1 | 12/2015 | Schobel | |
| 2016/0088408 A1 | 3/2016 | Solumn | |
| 2016/0286410 A1* | 9/2016 | O'Malley ............. | G06Q 30/06 |
| 2018/0262828 A1* | 9/2018 | Rajasekaran ........... | G06F 3/162 |
| 2019/0244632 A1* | 8/2019 | Rajasekaran ........... | G10L 15/02 |

OTHER PUBLICATIONS

Kevin Townsend et al: "Getting Started with Bluetooth Low Energy" In: "Getting Started with Bluetooth Low Energy," May 12, 2014, O'Reilly Media, XP055206773, ISBN: 978-1-49-194951-1 pp. 1-180, pp. 3, 21-23, p. 39.

European Patent Office, "International Search Report", pp. 20, dated Oct. 12, 2016, European Patent Office, P.B. 5818 Patentlaan 2 NL-2280 HV Rijswijk.

CEVA: "CEVA's Bluetooth Smart 4.2 IP is Now Fully Qualified by the Bluetooth SIG!", XP002768470, Retrieved from the Internet: URL:http://blog.ceva-dsp.com [retrieved on Mar. 22, 2017].

* cited by examiner

HEARING DEVICE WITH WIRELESS INTERFACE

The invention relates to a hearing device comprising a wireless interface for connecting to a plurality of client devices, such as a remote control, a fitting station, a smartphone, an audio streaming device or the second hearing device of a binaural system.

Ubiquitous electronic devices with wireless communication capabilities like smartphones, tablets, smartwatches and dedicated remote control devices represent an opportunity in leveraging the benefit of wireless-enabled hearing devices, such as hearing aids. Among the most prominent use-cases are audio streaming, remote-control and status-monitoring. Ideally, a user may pick any one of his wireless devices and start interacting with his hearing aids, pick another one and continue interaction with the second device and so forth.

A wireless protocol that matches particularly well the power-constraints of hearing aids as well as the required communication range is Bluetooth Low Energy (BTLE). Constraints of the BTLE protocol as well as power-constraints make it difficult to both maintain connections between a hearing device and multiple clients and to quickly respond to requests originating from any of the connected clients.

US 2016/0088408 A1 relates to a way of how to deal with the constraint of BTLE 4.0 to a single connection per BTLE peripheral device in a context where the BTLE protocol is intended to be used both to establish a binaural connection between hearing aids and to another client device, which is not a hearing device, like a streaming source or remote control. It is suggested that one or both of an interconnected pair of hearing devices transmits advertisements in order to announce their presence to client devices that may want to connect. Once a client device requests connection to one of the hearing device, this hearing device would drop the binaural link such that both hearing device become capable of connecting to a client device. Once the client tears down the connection to the hearing devices, they would re-establish the binaural connection.

US 2015/0350766 A1 relates to a method for managing connections among multiple computing devices accessing a user device supporting only a single connection. For this purpose, client devices need to interact among each other such that a second client device instructs a first client device to disconnect from the user device in order to become available for a connection with the second client device. Such method may be used, for example, for alternatingly connecting a headset via a BT connection to a laptop or to a mobile phone, with the laptop and the mobile phone coordinating with each other to achieve such switching of the BT connection.

Due to power consumption and, even more important, protocol scheduling constraints, a hearing device typically supports only a limited number of simultaneous connections to client devices such as remote controls, streaming devices or status display devices. A hearing device that is able to support a relatively large number of connections may be constrained such that the more connections it needs to maintain the more other capabilities exposed over this or another wireless interface degrade. For example, a wireless audio stream communicated over one connection may show an increasing number of dropouts the more simultaneous additional wireless connections need to be serviced.

It is an object of the invention to provide for a hearing device which allows for relatively user-convenient handling of connectivity of the hearing device to a plurality of client devices via a wireless interface. It is a further object to provide for a corresponding method.

According to the invention, these objects are achieved by a hearing device as defined in claim 1 and a method as defined in claim 33, respectively.

According to the invention the hearing device is provided with a BTLE 4.1 or higher interface which is controlled in such a manner that the hearing device transmits connectable advertising packets at least as long as less than N client devices are connected to the hearing device via a protected connection and less than N+1 client devices are connected to the hearing device in total and that the hearing device disconnects, if the hearing device is connected to N client devices via sustained connections and at least one of these connections is not a protected connection, one of the client devices connected to the hearing device via a not protected connection once a new sustained connection to a client device has been established, with N being a number equal to or greater than 2. Thereby, it can be automatically ensured that the hearing device at any time is not connected to more than N client devices by sustained connections, so that the number of simultaneously sustained connections can be kept relatively low, whereby interference between simultaneous connections can be avoided or reduced, while still connectivity to a relatively large number of client devices can be offered in a user-friendly manner.

Preferred embodiments of the invention are described in the dependent claims.

Hereinafter, examples of the invention will be illustrated by reference to the attached drawings, wherein.

Figure 3:
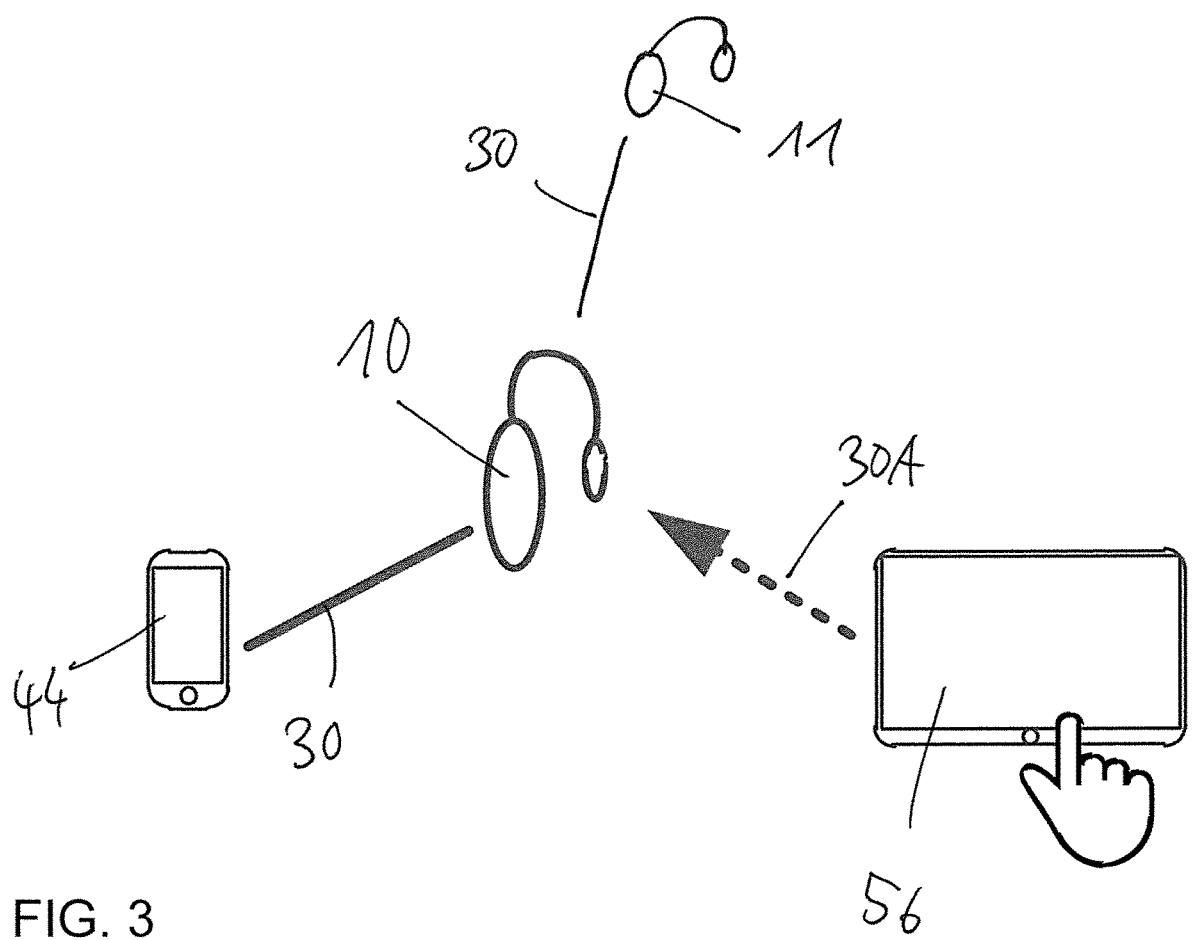
Figure 4:
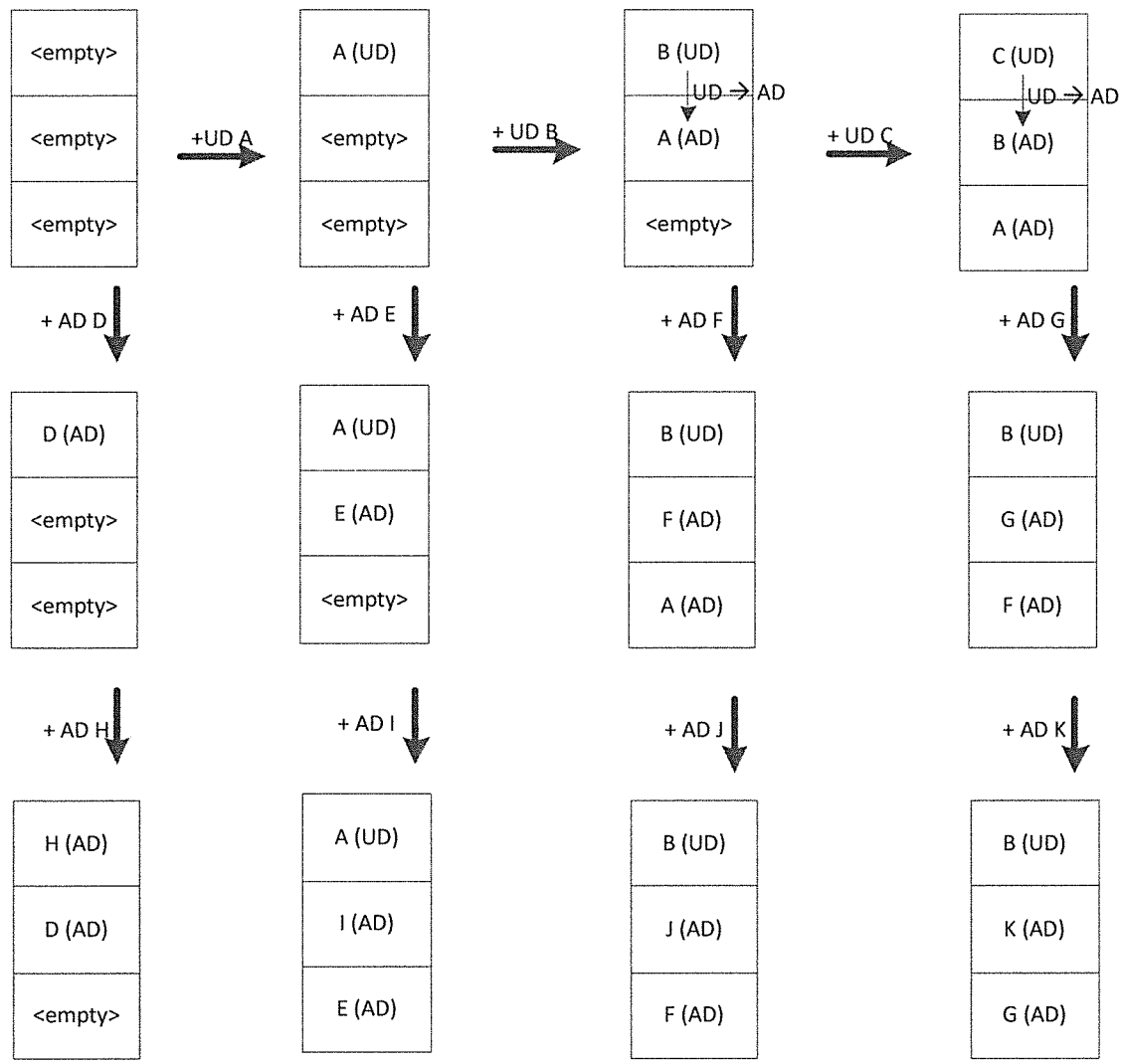

FIG. 3 is an illustration of another example of a use situation of a binaural hearing device system involving two different client devices, wherein each hearing device has a total capacity of N=2 sustained connections; and FIG. 4 is an illustration of connection replacement example between a hearing device and various client devices, wherein the hearing device has a total capacity of N=3 sustained connections and U=1 connections of client devices in a "user mode".

Figure 1:
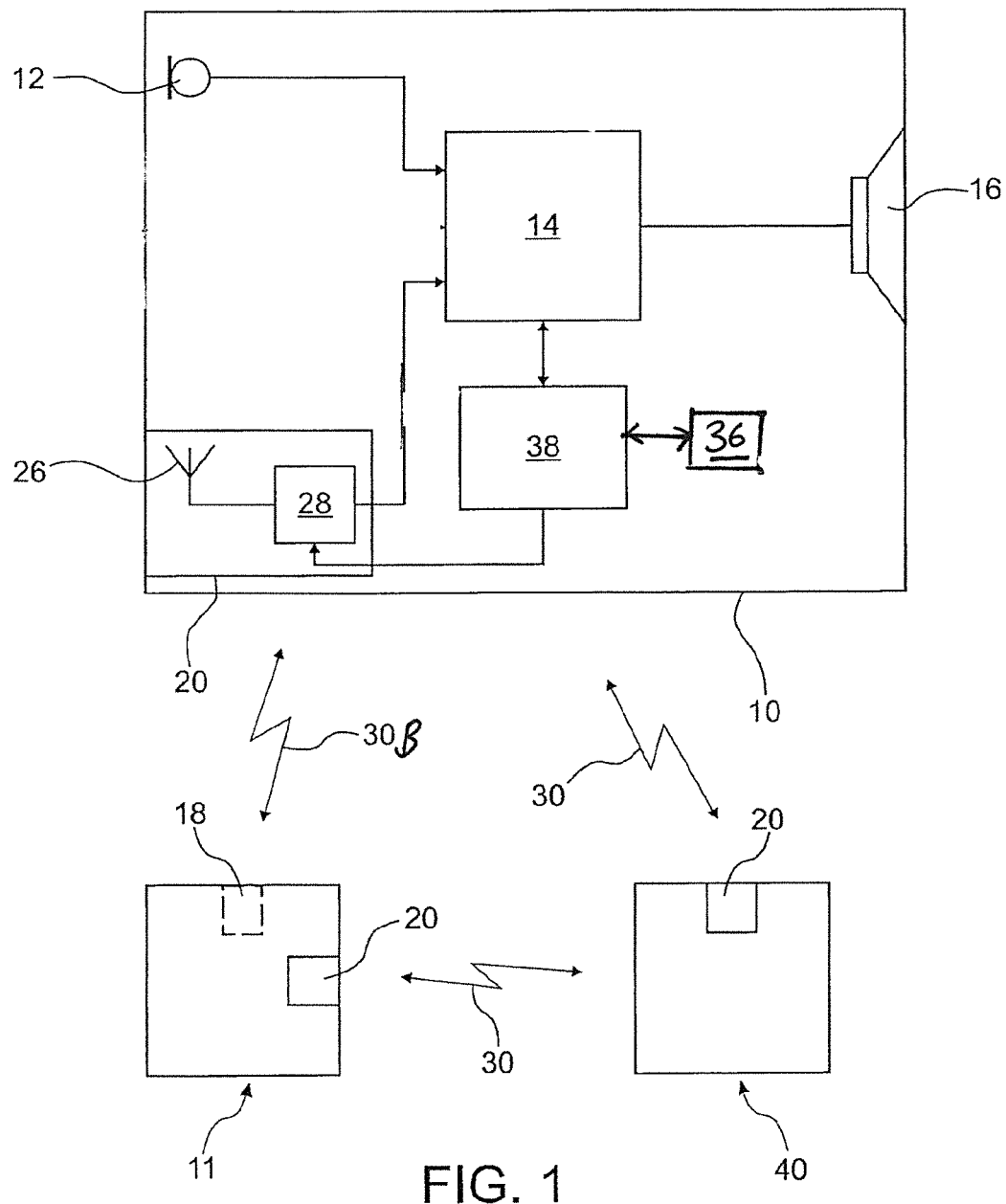
FIG. 1 is a schematic block diagram of an example of a hearing device to be used with the invention.

FIG. 1 is a block diagram of an example of a first hearing device 10 to be worn at one ear of a user which typically is used together with a second hearing device 11 to be worn at the other ear of the user. The first and second hearing devices 10, 11 are ear level devices and together form a binaural hearing system. Preferably, the hearing devices 10, 11 are hearing instruments, such as RIC (receiver in the canal), BTE (behind-the-ear), ITE (in-the-ear), ITC (in the canal) or CIC (completely-in-the-canal) hearing aids. However, the hearing devices, for example, also could be an auditory prosthesis, such as a cochlear implant device comprising an implanted cochlear stimulator and an external sound processor which may be designed as a BTE unit with a headpiece or as an integrated headpiece.

In the example of FIG. 1, the hearing devices 10, 11 are hearing aids comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals (these elements are shown in FIG. 1 only for the hearing aid 10). For example, the audio signal processing in the unit 14 may include acoustic beamforming (in this case, the microphone arrangement 12 comprises at least two spaced apart microphones).

The hearing aids 10, 11 comprise a wireless interface 20 comprising an antenna 26 and a transceiver 28. The interface 20 is provided for enabling wireless data exchange between the first hearing aid 10 and the second hearing aid 11 via a wireless link 30B which serves to realize a binaural hearing assistance system, allowing the hearing aids 10, 11 to exchange audio signals and/or control data and status data, such as the present settings of the hearing aids 10, 11.

The interface 20 is also provided for data exchange via a wireless link 30 from or to a client device 40, for example for receiving an audio data stream from an external device acting as an audio source, or data from a remote control device.

The interface 20 services at least BTLE 4.1 or higher. In addition, the interface 20 may service other protocols in time-multiplex within the same frequency band (e.g. BT Classic+BTLE+proprietary protocols all in 2.4 GHz band). Further, the hearing device 10 may even use protocols in different frequency bands, for which purposes additional wireless interfaces (not shown) may be provided.

The hearing aids 10, 11 also comprise a control unit 38 for controlling operation of the hearing aids 10, 11, with the control unit 38 acting on the signal processing unit 14 and the transceiver 28, and a memory 36 for storing data required for operation of the hearing aid 10, 11 and data required for operation of the interface 20, such as pairing/network data.

Figure 2:
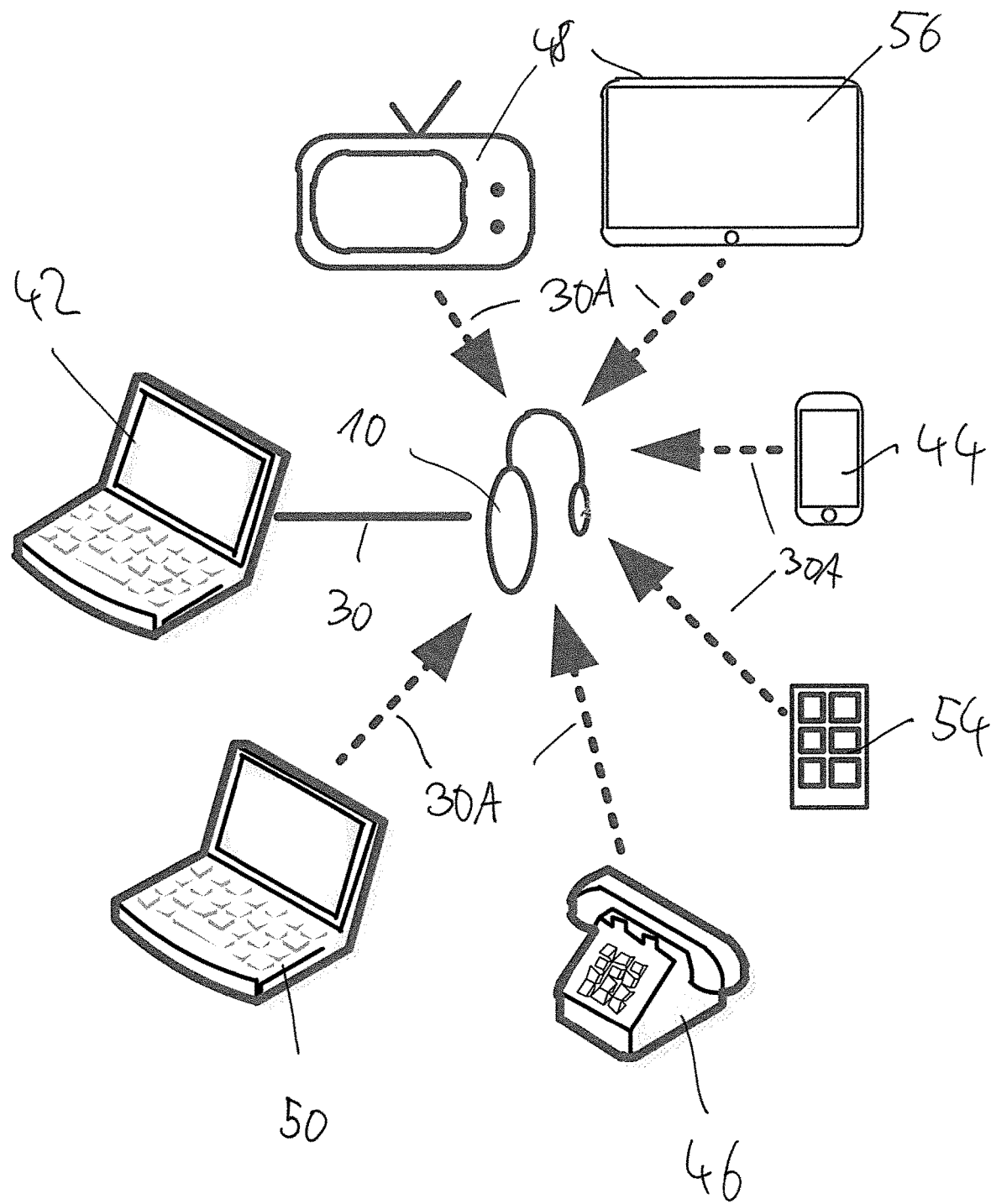
FIG. 2 is an illustration of an example of a use situation of a hearing device with a plurality of client devices.

In particular, the control unit 38 is configured to handle connectivity of the hearing device 10 via the wireless interface 20 to a plurality of client devices, like the devices shown in FIG. 2, according to a given set of rules. In the example of FIG. 2, the hearing device 10 is connected via a sustained connection 30 to a first fitting station 42 (which acts as one of the client devices), while other client devices, a smartphone 44, a telephone device 46, a media streamer 48, a remote control 54, a tablet 56 and a second fitting station 50, may try to connect with the hearing device 10 via connections 30A (shown in dashed lines in FIG. 2) which may be established as temporary or sustained connections upon request of the client device when accepted by the hearing device 10.

In case that the hearing device 10 is part of a binaural system with a second hearing device 11, the binaural link between the devices 10 and 11 may be an always protected connection, or it may use a separate wireless interface (i.e. separate from the wireless interface 20 used for connections to devices other than the second hearing device 11).

A sustained connection between the hearing device 10 and the respective client device serves to exchange data between the devices so that the hearing device 10 is enabled to make use of the functionalities of the respective client device. By contrast, a temporary connection between the hearing device 10 and the respective client device serves only for exchanging data for handling connectivity between the hearing device 10 and the client devices; for example, a temporary connection may be used for requesting a sustained connection, for requesting protection of the connection, and/or for identifying the client device as having a certain status, for example a "user mode client" or a "device of interest", as will be explained later.

The hearing device implements the roles of advertiser and peripheral for the BTLE protocol (according to BTLE protocol a device taking a peripheral role is a device which sent an advertising event which was answered by a "central" device by a connection request). In particular, the hearing device acts as an advertiser by transmitting connectable advertising packets at least as long as less than N client devices are connected to the hearing device via a protected connection and less than N+1 client devices are connected to the hearing device in total.

The hearing device may stop to transmit connectable advertising packets if N external devices are connected to the hearing device via sustained protected connections, so that all protected connections can be maintained while ensuring that no new connection is established as long as N protected connections are maintained, thereby limiting the number of sustained connections of the hearing device to N (the hearing device stops advertising or reverts to non-connectable advertising in order to prevent other client devices to request a new connection in addition to the N sustained connections). Once there are less than N protected sustained connections, the hearing device re-starts transmitting connectable advertising packets.

According to an alternative embodiment, the hearing device may continue transmitting connectable advertising packets even if there are already N protected sustained connections (so that an additional temporary connection is enabled); however, the hearing device in this case rejects a sustained connection with such temporarily connected client device, so that also in this case the number of sustained protected connections is actually limited to N (in BTLE rejecting/not accepting a connection by a device transmitting connectable advertisements means disconnecting the client device shortly after the client device has requested a connection or not responding to any data channel PDU).

In case that the hearing device is connected to N client devices via sustained connections and at least one of these connections is not a protected connection, a new temporary connection with a new client device may be established (thereby increasing the number of total connections to N+1), and once the hearing device accepts the temporary connection to become a sustained connection, the hearing device disconnects one of the sustained connections which are not protected so as to limit the number of sustained connections to N. According to one example, the hearing device may stop connectable advertising once there are N sustained connections plus one temporary connection (in such situation no additional client device should connect to the hearing device, since in addition to the N sustained connections there should be only one temporary connection).

The attribute "protected" may be conferred to a connection by the hearing device either automatically or upon request by the client device. For example, the hearing device may tag a connection as protected as long as the connection serves a given purpose, such as the exchange of audio data, thereby ensuring that a connection is maintained for the entire duration of an audio transport. According to another example, the hearing device may tag a connection as protected for a given protection time period starting once the connection is established in order to ensure that the client device has sufficient time to send information to the hearing device which is important for connectivity handling by the hearing device. For example, during the protection time period the client device has the opportunity to send a protection request to the hearing device. Further, during the protection time period the client device may send status information to the hearing device, such as information identifying the client device as a "device of interest" or as a "user client device", as will be explained later.

According to one example, the hearing device rejects a sustained connection to a client device not paired with the hearing device when the hearing device is not in a pairable state. On the other hand, if the hearing device is in a pairable state, it may accept a sustained connection to a client device not paired with the hearing device if the client device has identified itself as a device of interest within a given identification time period (which may correspond to the protection time period mentioned above). A "device of interest" is a client device of a certain type, such as a remote control, a servicing device or an audio source or audio sink; more generally, a device of interest is a device which is known to be able to use the services offered by the hearing device or provides evidence that it is able to use the services offered by the hearing device. Thus, a device of interest is allowed to access the hearing device during the entire extent of the pairable state of the hearing device, but any other client devices, i.e. devices which have not identified themselves as a device of interest, will neither overwrite existing pairings on the hearing device nor consume resources over extended periods of time (i.e. periods of time extending the identification time period).

According to one example, in a binaural pair of hearing devices which maintain a binaural data connection, one hearing device may continuously transmit advertisements, while its peer hearing device does not and therefore saves resources. Once a client device connects to the hearing device, the hearing device instructs its peer hearing device to temporarily advertise in order to allow the same client device to also connect to the peer hearing device. Once the newly connected client device has also connected to the hearing device or a timeout has elapsed, the peer hearing device stops advertising.

According to one example, the hearing device may remove the pairing of a client device once the client device is found to violate a predefined set of rules in order to prevent that client device from excessive use of connection resources. For example, such predefined set of rules may be the restriction that a client device of a given category/type must not attempt to (re-)connect more than a limited number of times within a given time interval.

In the case in which the hearing device has already N sustained connections including at least one non-protected connection and a new sustained connection is to be established in addition to the N sustained connections, the hearing device may disconnect the least recently connected client device having a non-protected connection; alternatively, the client device having the least recent interaction with the hearing device may be disconnected (rather than the least recently connected client device).

FIG. 3 is an illustration of a use case wherein the maximum number of simultaneously supported sustained connections is N=2, wherein first there is a sustained connection 30 of the hearing device 10 to a first client device 44, with a second client device 56 being temporarily connected via a temporary connection 30A to the hearing device 10; in addition, there is a protected sustained connection 30 to a second hearing device 11 of a binaural hearing system. Once the hearing device 10 accepts the second client device 56 for a sustained connection, there is a conflict with the rule that there should be not more than N=2 sustained connections for the hearing device 10, which conflict is solved by tearing down the sustained connection 30 to the first client device 44.

While the above-described examples are particularly suitable for cases in which a hearing device is to be connected with several client devices belonging to a single user wherein the client device does not request a connection unless triggered by an explicit user gesture (under these conditions, the user is in control and is able to accept that an older connection is torn down for the sake of another client device on which he/she has just made a gesture on), a modified concept is required for cases in which client devices may autonomously (i.e. without a respective user gesture) connect with the hearing device. For example, a client device may need to poll e.g. every 5 minutes for the battery level of the hearing device. In this case, without differentiating between different types of client devices in connectivity handling, the user, possibly using other client devices like a remote control, would be spontaneously disconnected every 5 minutes by the polling client device, which would likely become annoying to the user.

Such cases may be handled by differentiating between different types of client devices so as to define priorities among client devices. Such concept may be implemented by differentiating between "user clients" and autonomous clients", wherein the hearing device associates one of the attributes "user mode client" and "autonomous mode client" with a (temporarily) connected client device, and by handling connectivity of the client devices in a manner depending on the attributes associated with the client devices. In some cases, the association of the attribute with a certain client device may be changed in the process of connection priority handling. Typically, a "user mode client" is a client device which initiates a connection to the hearing device as a result of a user gesture on the client device, and an "autonomous mode client" is a client device which initiates a connection to the hearing device according to a pre-programed scheme, i.e. an "autonomous mode client" tries to connect automatically to the hearing device.

The hearing device may associate the attribute "user mode client" with a newly (temporarily) connected client device if the client device identifies itself as a user mode client within a predetermined identification time period (during that time period the temporary connection should be protected). The hearing device may associate the attribute "autonomous mode client" with the newly connected client device if the client device fails to identify itself as a user mode client within the identification time period.

The hearing device may accept a sustained connection with a newly connected client device irrespective of the attribute associated with the client device if the hearing device presently maintains less than N sustained connections. However, the hearing device may reject a sustained connection with a newly connected client device irrespective of its attribute if the hearing device presently maintains N protected sustained connections.

The hearing device may change the attribute of a client device connected via a sustained connection from "user mode client" to "autonomous mode client" if the client device fails to interact with the hearing device for more than a predetermined interaction timeout time period, thereby lowering the priority of substantially inactive devices.

Preferably, the hearing device is configured to maintain not more than U sustained connections with client devices associated with the attribute "user mode client", wherein U is less than or equal to N (the maximum allowable number of sustained connections). "User mode clients" may be given priority over "autonomous mode clients" according to the following scheme. The hearing device will accept a sustained connection with a newly connected client associated with the attribute "user mode client" only if there are presently not more than U sustained connections with client devices associated with the attribute "user mode client". If this newly accepted sustained connection would make in the number of sustained connections increase above N, the hearing device would disconnect the least recently connected (or least recently active) client device associated with the attribute (autonomous mode client). Further, if the newly accepted sustained connection would make the number of sustained connections with client devices having the attribute "user mode client" increase above U, the hearing device would change the attribute of the least recently connected (or least recently active) client device associated with the attribute "user mode client" to "autonomous mode client".

In case that there are presently N sustained connections with client devices and at least one of these client devices is associated with the attribute "autonomous mode client", the hearing device would accept a sustained connection with a newly connected client device associated with the attribute "autonomous mode client" and would disconnect the least recently connected (or least recently active) one of the client devices associated with the attribute "autonomous mode client" after acceptance of the new sustained connection.

However, if among the N sustained connections there is no connection to a client device with the attribute "autonomous mode client" (i.e. if all client devices are "user mode clients"), the hearing device would reject a sustained connection with a newly connected client device associated with the attribute "autonomous mode client".

According to one example, the hearing device may disconnect a client device having the attribute "autonomous mode client" if there was no exchange of control information, i.e. if there was no interaction, for more than a predetermined control information exchange timeout time period.

Hereinafter an example for the case N=2 and U=2 will be described. In an initial state, a hearing device may be connected via a sustained protected connection to another hearing device of a binaural hearing system (as a user mode client) and a sustained connection to a remote control application RCA1 running on a client device which is an "autonomous mode client", wherein RCA1 polls regularly for the battery status of the hearing device and updates the display of the battery status accordingly. The user of the hearing device then may launch a remote control application RCA2 running on another paired client device, such as a tablet, with RCA2 attempting thereupon to connect to the hearing device as a "user mode client". Since N=2 and U=2, the hearing device will grant priority to RCA2 over RCA1 and accordingly will disconnect from RCA1 (user mode clients are preferred over autonomous mode clients). While RCA2 is connected as a "user mode client" (i.e. as long as the user keeps using RCA2), the hearing device rejects reconnection attempts from RCA1 (because N=2 and "user mode clients" have priority over "autonomous mode clients"), so that RCA1 will accordingly fail to update its displayed battery status. While the hearing device is connected to RCA2 as a "user mode client", the user may launch a remote control application RCA3 on a third paired client device, such as a smartphone. Since newly requested connections of "user mode clients" have priority over any existing connection, the hearing device will disconnect from RCA2 and will connect to RCA3 as a "user mode client". Once the user will exit RCA3 (or when RCA3 enters a screensaver mode, i.e. when RCA3 is no longer active), the hearing device will disconnect from RCA3, so that later, when another client device, such as RCA4 or RCA1, tries to connect as an "autonomous mode client" for a battery status update, the hearing device will accept the connection and the newly connected client device will be able to display the battery status.

Thus, the hearing device is able to service several autonomously polling devices as well as several user initiated services while not using more than one sustained connection and not having the user interrupted by an autonomous client device request.

FIG. 4 is an illustration of a similar use example, however, with N=3 and U=1, wherein each three-fold box represents the connectivity status of the hearing device at a given point in time, "+A(UM)" indicates that a client device A requests connection as a "user mode client" and "+D(AM)" indicates that a client device D requests connection as an "autonomous mode client"; "A(UM)" in a box indicates that the hearing device is presently connected to client device A as a "user mode client", etc.

According to one embodiment, the hearing device may insert additional information in its advertisements concerning the status of the hearing device.

For example, the hearing device may include in its advertisements information indicating free connection capacity of the hearing device, such as in case that the hearing device presently is connected by less than N sustained connections or there are N sustained connections but not all of them are protected, etc. Such concept could be used as an alternative or an extension to the above concept of differentiating the client devices by attributes like "user mode client" and "autonomous mode client". In this case, for example, a polling client device would attempt to connect to the hearing device only when the polling client device is aware from the free connection information that the hearing device is able to support an additional connection.

Examples for other status information, in particular status change information, may be: the state of a local user control (e.g. a button) has changed (e.g. the button has been pressed or released); the hearing device is ready or not ready to accept an audio stream over a wireless connection, wherein the inserted information may contain an identifier characterizing the type or priority of an audio stream that may be accepted (such identifier may, for example, refer to classes like "telephony", "TV audio", "media audio", "navigation information", "public announcement", and "advertisements".

The invention claimed is:

1. A hearing device comprising a wireless interface and a control unit for handling connectivity via the wireless interface to a plurality of client devices, wherein the control unit is configured to direct the hearing device to limit the number of connections between the hearing device and client devices to N, wherein N>2, by disconnecting a client device every time an N+1 client device establishes a connection where the number N is referred to as sustained connections and any additional connection exceeding the number N is referred to as temporary connection, wherein the control unit is further configured to direct the hearing device to transmit connectable advertising packets as long as less than N client devices are connected to the hearing device.

2. The hearing device of claim 1, wherein the control unit is configured to reject a sustained connection with a temporarily connected client device.

3. The hearing device of claim 1, wherein the control unit is configured to tag a connection to a client device as protected as long as the connection serves a purpose.

4. The hearing device of claim 3, wherein the control unit is configured to tag a connection to a client device as protected as long as the connection serves to exchange audio data.

5. The hearing device of claim 1, wherein the control unit is configured to tag a connection to a client device as protected for a given protection time period starting once the connection is established.

6. The hearing device of claim 1, wherein the control unit is configured to tag a connection to a client device as protected upon a protection request from the client device.

7. The hearing device of claim 6, wherein the control unit is configured to reject a connection to a client device not paired with the hearing device when the hearing device is not in a pairable state.

8. The hearing device of claim 1, wherein the control unit is configured to accept a sustained connection to a client device not paired with the hearing device if the hearing device is in a pairable state and the client device has identified itself as a device of interest within a given identification time period, wherein a device of interest is a client device of a certain type.

9. The hearing device of claim 8, wherein a device of interest is a remote control, a servicing device or an audio source or sink.

10. The hearing device of claim 1, wherein the control unit is (30) configured to remove the pairing of a client device (40, 42, 44, 46, 48, 50, 54, 56) with the hearing device (10) once the client device is found by the control unit (38) to violate a predefined set of rules.

11. The hearing device of claim 1, wherein the control unit is configured to disconnect the least recently connected client device having a not protected connection if N client devices have a sustained connection with the hearing device and a new sustained connection to a client device is to be established in addition to the N sustained connections.

12. The hearing device of claim 1, wherein the control unit is configured to direct the hearing device to include in its advertising information indicating free connection capacity if the hearing device is presently able to accept at least one new connection.

13. The hearing device of claim 1, wherein the control unit is configured to associate one of the attributes "user mode client" and "autonomous mode client" with a connected client device and to handle connectivity of the client devices in a manner depending on the attributes associated with the client devices.

14. The hearing device of claim 13, wherein the control unit is configured to associate the attribute "user mode client" with a connected client device if the client device identifies itself as a "user mode client" within a predetermined identification time period.

15. The hearing device of claim 13, wherein the control unit is configured to associate the attribute "autonomous mode client" with a newly connected client device if the client device fails to identify itself as a "user mode client" within a predetermined identification time period.

16. A method of handling connectivity of a hearing device comprising a wireless interface via the wireless interface to a plurality of client devices, comprising:
   transmitting connectable advertising packets from the hearing device as long as less than N client devices are connected to the hearing device via a protected connection and less than N+1 client devices are connected to the hearing device in total; and
   preventing the hearing device from maintaining sustained connections to more than N client devices at a time by disconnecting, if the hearing device is connected to N client devices via sustained connections and at least one of these connections is not a protected connection, one of the client devices connected via a not protected connection once a new sustained connection to a client device has been established in addition to the N connections, wherein N≥2.

17. The method of claim 16, the method further comprising:
   determining to disconnect a client device once N+1 connections are established from an ordered list of all N+1 connected client devices, wherein the list consists of a subset of protected devices that are not candidates for disconnection and a subset of other devices that are ordered according to priority where the client device with lowest priority is selected as the one to be disconnected based on criteria, wherein the criteria to tag devices as protected is at least one of the following: client devices that the hearing device is exchanging audio data with, client devices with that the time since the connection has not yet reached a protection time threshold, client devices that were explicitly designated by a protection request and where criteria for priority ordering of non-protected devices are arbitrary or the time since establishment of the connection giving higher priority to more recent connections or whether a device is paired with the hearing device or not giving higher priority to paired devices when the hearing device is not in pairable state or the time since the last application-level interaction where the client device with the most recent interaction is given priority or whether a client device has identified itself as a client device of interest or a user mode client.

* * * * *